United States Patent
Inazuka et al.

(10) Patent No.: US 9,076,597 B2
(45) Date of Patent: Jul. 7, 2015

(54) MONOLITHIC CERAMIC CAPACITOR

(71) Applicant: Murata Manufacturing Co., Ltd., Nagaokakyo-shi, Kyoto-fu (JP)

(72) Inventors: Tomokazu Inazuka, Nagaokakyo (JP); Akihiro Shimizu, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/493,527

(22) Filed: Sep. 23, 2014

(65) Prior Publication Data

US 2015/0116896 A1   Apr. 30, 2015

(30) Foreign Application Priority Data

Oct. 25, 2013  (JP) .................................. 2013-222247
Jul. 31, 2014  (JP) .................................. 2014-156804

(51) Int. Cl.
  *H01G 4/30* (2006.01)
  *H01G 4/005* (2006.01)
  *H01G 4/06* (2006.01)
  *H01G 4/12* (2006.01)

(52) U.S. Cl.
  CPC ........... *H01G 4/1227* (2013.01); *H01G 4/1236* (2013.01); *H01G 4/1218* (2013.01); *H01G 4/30* (2013.01)

(58) Field of Classification Search
  CPC .............................. H01G 4/30; H01G 4/0085
  USPC ........................ 361/303, 301.4, 311
  See application file for complete search history.

(56) References Cited

U.S. PATENT DOCUMENTS

| | | | | |
|---|---|---|---|---|
| 5,111,356 A | * | 5/1992 | Hardy | 361/321.2 |
| 6,377,439 B1 | * | 4/2002 | Sekidou et al. | 361/303 |
| 2006/0256504 A1 | * | 11/2006 | Kojima | 361/311 |
| 2014/0177127 A1 | * | 6/2014 | Kim | 361/301.4 |
| 2014/0182907 A1 | * | 7/2014 | Lee et al. | 174/258 |
| 2014/0209363 A1 | * | 7/2014 | Oh et al. | 174/260 |
| 2014/0209364 A1 | * | 7/2014 | Oh et al. | 174/260 |

FOREIGN PATENT DOCUMENTS

JP   2013-012418 A   1/2013

* cited by examiner

*Primary Examiner* — Eric Thomas
(74) *Attorney, Agent, or Firm* — Keating & Bennett, LLP

(57) ABSTRACT

A monolithic ceramic capacitor includes an element body including a multilayer portion including a plural conductor layers and plural ceramic dielectric layers alternately stacked in a thickness direction. The element body is divided in the thickness direction into thickness-direction first and outer layer portions made of the ceramic dielectric layers, and a thickness-direction inner layer portion including the multilayer portion. The element body bulges to the outer side at a center portion in a length direction, and center portions in the length direction of the plural conductor layers are curved to the outer side. The thickness of a portion of the first outer layer portion adjacent to a first extension portion is larger than the thickness of a center portion thereof, and the thickness of a portion of the second outer layer portion adjacent to a second extension portion is larger than the thickness of a center portion thereof.

6 Claims, 10 Drawing Sheets

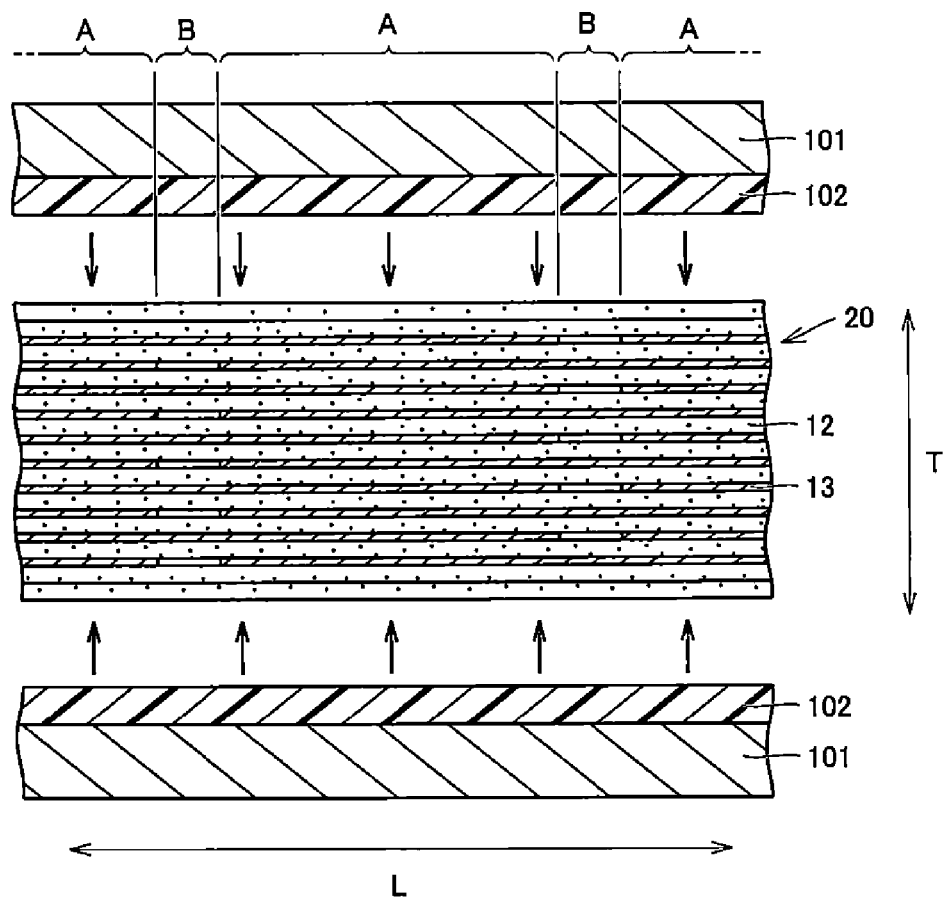
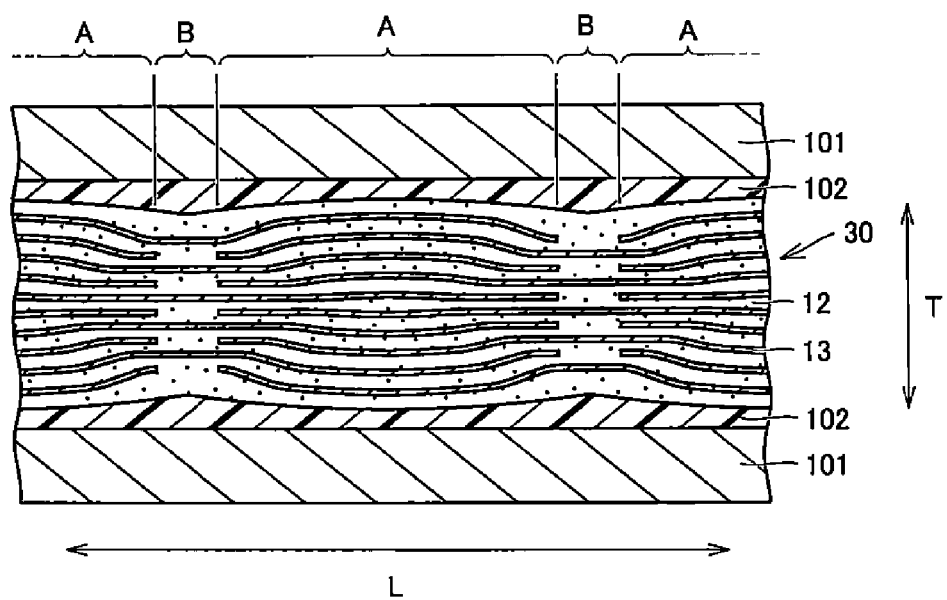

FIG. 9

| | | | EXAMPLE 1 | EXAMPLE 2 | EXAMPLE 3 |
|---|---|---|---|---|---|
| DESIGN CONDITION (DESIGN VALUE) | LENGTH [mm] | | 0.4 | 0.6 | 1.0 |
| | WIDTH [mm] | | 0.2 | 0.3 | 0.5 |
| | THICKNESS [mm] | | 0.2 | 0.3 | 0.5 |
| | ELECTROSTATIC CAPACITY VALUE [μF] | | 0.22 | 2.2 | 10 |
| | DISTANCE BETWEEN INNER ELECTRODE LAYERS [μm] | | 0.68 | 0.89 | 0.76 |
| | THICKNESS OF INNER ELECTRODE LAYER [μm] | | 0.55 | 0.63 | 0.76 |
| | NUMBER OF STACKED INNER ELECTRODE LAYERS | | 140 | 229 | 356 |
| MEASURED RESULT (MEASURED VALUE) | ELEMENT-BODY THICKNESS | $D1\ [\mu m]$ | 196 | 372 | 612 |
| | | $D2\ [\mu m]$ | 176 | 340 | 571 |
| | | $D3\ [\mu m]$ | 164 | 318 | 539 |
| | MULTILAYER-PORTION THICKNESS | $d1\ [\mu m]$ | 172 | 342 | 557 |
| | | $d2\ [\mu m]$ | 142 | 286 | 498 |
| | | $d3\ [\mu m]$ | 144 | 314 | 520 |
| | ELEMENT-BODY BULGING AMOUNT | $M\ [\mu m]$ | 10 | 16 | 20.5 |
| | | $N\ [\mu m]$ | 16 | 27 | 36.5 |
| | MULTILAYER-PORTION BULGING AMOUNT | $m\ [\mu m]$ | 15 | 28 | 29.5 |
| | | $n\ [\mu m]$ | 14 | 14 | 18.5 |

MONOLITHIC CERAMIC CAPACITOR

BACKGROUND OF THE INVENTION

1. Field of the Invention

The present invention relates to a monolithic ceramic capacitor, which is a type of capacitor element and which includes a dielectric layer including a ceramic dielectric material.

2. Description of the Related Art

A capacitor element generally includes an element body, in which conductor layers and dielectric layers are alternately stacked, and an outer electrode provided on an outer surface of the element body. The monolithic ceramic capacitor is a type of capacitor element, in which the dielectric layers include a ceramic dielectric material.

The monolithic ceramic capacitor typically includes therein a substantially rectangular-parallelepiped-shaped multilayer portion, in which a plurality of conductor layers serving as inner electrode layers and a plurality of ceramic dielectric layers are alternately densely stacked. The multilayer portion is covered with an outer layer portion formed of ceramic dielectric layers, and an extension layer portion, in which a relatively small number of the conductor layers are included as an extension portion in the ceramic dielectric layers. Thus, the above-described element body is formed.

To increase the capacity of the monolithic ceramic capacitor, it is required to increase the facing area between adjacent conductor layers included in the multilayer portion. To increase the facing area, it is effective to increase the density of the conductor material of a portion in which the conductor layers are arranged (so-called inner electrode density). Accordingly, continuity of the conductor layers is increased, the above-described facing area is increased, and thus the capacity of the monolithic ceramic capacitor is increased.

For example, Japanese Unexamined Patent Application Publication No. 2013-12418 discloses a monolithic ceramic capacitor with the increased continuity of the conductor layers.

However, when the continuity of the conductor layers is increased, delamination likely occurs. The delamination is a separation phenomenon occurring because of a large difference between likelihood of contraction of the conductor layer and likelihood of contraction of the ceramic dielectric layer. When thermal history is added, the thermal history acts as a shear force at a boundary portion between the ceramic dielectric layer and the conductor layer.

In particular, the delamination more likely occurs between the multilayer portion, in which the conductor layers and the ceramic dielectric layers are densely stacked, and the above-described outer layer portion. The delamination may cause a decrease in reliability as a product, and may cause a decrease in yield in a manufacturing process.

For example, the manufacturing flow of the monolithic ceramic capacitor typically includes metal-plating processing, which is processing of forming the outer electrode. In the metal-plating processing, the element body is immersed in solder liquid. At this time, if the delamination is occurring, adhesion between the dielectric layer and the conductor layer is insufficient, and the solder liquid enters an inner side portion of the element body through the portion in which the delamination is occurring. Consequently, the insulation resistance value between the conductor layers, the insulation of which should be sufficiently kept, is decreased, and hence the reliability may be decreased and the yield may be decreased.

SUMMARY OF THE INVENTION

Accordingly, preferred embodiments of present invention provide a monolithic ceramic capacitor with increased reliability and increased yield.

According to a preferred embodiment, a monolithic ceramic capacitor includes an element body including therein a multilayer portion including a plurality of conductor layers and a plurality of ceramic dielectric layers alternately stacked in a thickness direction, and an outer electrode is provided on an outer portion of the element body. The capacitor has dimensions of about 0.4 mm length, about 0.2 mm width and about 0.2 mm thickness. Outer surfaces of the element body include a first principal surface and a second principal surface opposed in the thickness direction, a first end surface and a second end surface opposed in a length direction perpendicular or substantially perpendicular to the thickness direction, and a first side surface and a second side surface opposed in a width direction perpendicular or substantially perpendicular to both the thickness direction and the length direction. The outer electrode includes a first outer electrode arranged to cover the first end surface, and a second outer electrode arranged to cover the second end surface. The element body is divided in the thickness direction into a thickness-direction first outer layer portion that includes the ceramic dielectric layer and defines the first principal surface, a thickness-direction second outer layer portion that includes the ceramic dielectric layer and defines the second principal surface, and a thickness-direction inner layer portion including the multilayer portion and located between the thickness-direction first outer layer portion and the thickness-direction second outer layer portion. Among the plurality of conductor layers included in the thickness-direction inner layer portion, a first conductor layer arranged at a position closest to the first principal surface is provided at a position adjacent to the ceramic dielectric layer defining the thickness-direction first outer layer portion. Among the plurality of conductor layers included in the thickness-direction inner layer portion, a second conductor layer arranged at a position closest to the second principal surface is provided at a position adjacent to the ceramic dielectric layer defining the thickness-direction second outer layer portion. One portion of the plurality of conductor layers including the first conductor layer is connected with the first outer electrode through a first extension portion extending from the multilayer portion toward the first end surface side. Another portion of the plurality of conductor layers including the second conductor layer is connected with the second outer electrode through a second extension portion extending from the multilayer portion toward the second end surface side. Center portions in the length direction of both the first principal surface and the second principal surface bulge to an outer side so that a thickness of the element body is minimum at both end portions in the length direction. Each of the plurality of conductor layers has a curved shape in the length direction so that a center portion in the length direction of each of the plurality of conductor layers is close to a closer one of the first principal surface and the second principal surface. Center portions in the width direction of both the first principal surface and the second principal surface bulge to the outer side so that the thickness of the element body is minimum at both end portions in the width direction. Each of the plurality of conductor layers has a curved shape in the width direction so that a center portion in the width direction of each of the plurality of conductor layers is close to a closer one of the first principal surface and the second principal surface. In any cross-section parallel or substantially parallel to both the thickness direction and the length direction, a thickness of a portion of the thickness-direction first outer layer portion adjacent to the first extension portion is larger than a thickness of a center portion in the length direction of the thickness-direction first outer layer portion, and a thickness of a portion of the thickness-direction second outer layer portion adjacent to the second extension portion is larger than a thickness of a center portion in the length direction of the thickness-direction second outer layer portion. Where a bulging amount of the element body whose center portion along the length direction bulges to the outer side is defined as an element-body bulging amount M, a bulging amount of the element body whose center portion along the width direction bulges to the outer side is defined as an element-body bulging amount N, a bulging amount of the multilayer portion whose center portion along the length direction bulges to the outer side is defined as a multilayer-portion bulging amount m, and a bulging amount of the multilayer portion whose center portion along the width direction bulges to the outer side is defined as a multilayer-portion bulging amount n. A number of stacked conductor layers is 140 or greater, the element-body bulging amount N and the multilayer-portion bulging amount n are about 10 μm or greater, respectively, and a relationship N>n is satisfied, and the element-body bulging amount M and the multilayer-portion bulging amount m are about 10 μm or greater, respectively, and a relationship M<m is satisfied.

In the above-described monolithic ceramic capacitor according to a preferred embodiment of the present invention, each of the plurality of ceramic dielectric layers preferably includes at least one of barium titanate, $CaZrO_3$, $CaTiO_3$, and $SrTiO_3$.

A monolithic ceramic capacitor according to another preferred embodiment of the present invention includes an element body including therein a multilayer portion including a plurality of conductor layers and a plurality of ceramic dielectric layers alternately stacked in a thickness direction, and an outer electrode is provided on an outer portion of the element body. The capacitor has dimensions of about 0.6 mm length, about 0.3 mm width and about 0.3 mm thickness. Outer surfaces of the element body include a first principal surface and a second principal surface opposed in the thickness direction, a first end surface and a second end surface opposed in a length direction perpendicular or substantially perpendicular to the thickness direction, and a first side surface and a second side surface opposed in a width direction perpendicular or substantially perpendicular to both the thickness direction and the length direction. The outer electrode includes a first outer electrode arranged to cover the first end surface, and a second outer electrode arranged to cover the second end surface. The element body is divided in the thickness direction into a thickness-direction first outer layer portion that includes the ceramic dielectric layer and defines the first principal surface, a thickness-direction second outer layer portion that includes the ceramic dielectric layer and defines the second principal surface, and a thickness-direction inner layer portion including the multilayer portion and located between the thickness-direction first outer layer portion and the thickness-direction second outer layer portion. Among the plurality of conductor layers included in the thickness-direction inner layer portion, a first conductor layer arranged at a position closest to the first principal surface is provided at a position adjacent to the ceramic dielectric layer defining the thickness-direction first outer layer portion. Among the plurality of conductor layers included in the thickness-direction inner layer portion, a second conductor layer arranged at a position closest to the second principal surface is provided at a position adjacent to the ceramic dielectric layer defining the thickness-direction second outer layer portion. One portion of the plurality of conductor layers including the first conductor layer is connected with the first outer electrode through a first extension portion extending from the multilayer portion toward the first end surface side. Another portion of the plurality of conductor layers including the second conductor layer is connected with the second outer electrode through a second extension portion extending from the multilayer portion toward the second end surface side. Center portions in the length direction of both the first principal surface and the second principal surface bulge to an outer side so that a thickness of the element body is minimum at both end portions in the length direction. Each of the plurality of conductor layers has a curved shape in the length direction so that a center portion in the length direction of each of the plurality of conductor layers is close to a closer one of the first principal surface and the second principal surface. Center portions in the width direction of both the first principal surface and the second principal surface bulge to the outer side so that the thickness of the element body is minimum at both end portions in the width direction. Each of the plurality of conductor layers has a curved shape in the width direction so that a center portion in the width direction of each of the plurality of conductor layers is close to a closer one of the first principal surface and the second principal surface. In any cross-section parallel or substantially parallel to both the thickness direction and the length direction, a thickness of a portion of the thickness-direction first outer layer portion adjacent to the first extension portion is larger than a thickness of a center portion in the length direction of the thickness-direction first outer layer portion, and a thickness of a portion of the thickness-direction second outer layer portion adjacent to the second extension portion is larger than a thickness of a center portion in the length direction of the thickness-direction second outer layer portion. Where a bulging amount of the element body whose center portion along the length direction bulges to the outer side is defined as an element-body bulging amount M, a bulging amount of the element body whose center portion along the width direction bulges to the outer side is defined as an element-body bulging amount N, a bulging amount of the multilayer portion whose center portion along the length direction bulges to the outer side is defined as a multilayer-portion bulging amount m, and a bulging amount of the multilayer portion whose center portion along the width direction bulges to the outer side is defined as a multilayer-portion bulging amount n. A number of stacked conductor layers is 200 or greater, the element-body bulging amount N and the multilayer-portion bulging amount n are about 14 μm or greater, respectively, and a relationship N>n is satisfied, and the element-body bulging amount M and the multilayer-portion bulging amount m are about 15 μm or greater, respectively, and a relationship M<m is satisfied.

In the above-described monolithic ceramic capacitor according to another preferred embodiment of the present invention, each of the plurality of ceramic dielectric layers preferably includes at least one of barium titanate, $CaZrO_3$, $CaTiO_3$, and $SrTiO_3$.

A monolithic ceramic capacitor according to another preferred embodiment of the present invention includes an element body including therein a multilayer portion including a plurality of conductor layers and a plurality of ceramic dielectric layers alternately stacked in a thickness direction, and an outer electrode provided on an outer portion of the element body. The capacitor has dimensions of about 1.0 mm length, about 0.5 mm width and about 0.5 mm thickness. Outer surfaces of the element body include a first principal surface and a second principal surface opposed in the thickness direction, a first end surface and a second end surface opposed in a length direction perpendicular or substantially perpendicular to the thickness direction, and a first side surface and a second side surface opposed in a width direction perpendicular or substantially perpendicular to both the thickness direction and the length direction. The outer electrode includes a first outer electrode arranged to cover the first end surface, and a second outer electrode arranged to cover the second end surface. The element body is divided in the thickness direction into a thickness-direction first outer layer portion that includes the ceramic dielectric layer and defines the first principal surface, a thickness-direction second outer layer portion that includes the ceramic dielectric layer and defines the second principal surface, and a thickness-direction inner layer portion including the multilayer portion and located between the thickness-direction first outer layer portion and the thickness-direction second outer layer portion. Among the plurality of conductor layers included in the thickness-direction inner layer portion, a first conductor layer arranged at a position closest to the first principal surface is provided at a position adjacent to the ceramic dielectric layer defining the thickness-direction first outer layer portion. Among the plurality of conductor layers included in the thickness-direction inner layer portion, a second conductor layer arranged at a position closest to the second principal surface is provided at a position adjacent to the ceramic dielectric layer defining the thickness-direction second outer layer portion. One portion of the plurality of conductor layers including the first conductor layer is connected with the first outer electrode through a first extension portion extending from the multilayer portion toward the first end surface side. Another portion of the plurality of conductor layers including the second conductor layer is connected with the second outer electrode through a second extension portion extending from the multilayer portion toward the second end surface side. Center portions in the length direction of both the first principal surface and the second principal surface bulge to an outer side so that a thickness of the element body is minimum at both end portions in the length direction. Each of the plurality of conductor layers has a curved shape in the length direction so that a center portion in the length direction of each of the plurality of conductor layers is close to a closer one of the first principal surface and the second principal surface. Center portions in the width direction of both the first principal surface and the second principal surface bulge to the outer side so that the thickness of the element body is minimum at both end portions in the width direction. Each of the plurality of conductor layers has a curved shape in the width direction so that a center portion in the width direction of each of the plurality of conductor layers is close to a closer one of the first principal surface and the second principal surface. In any cross-section parallel or substantially parallel to both the thickness direction and the length direction, a thickness of a portion of the thickness-direction first outer layer portion adjacent to the first extension portion is larger than a thickness of a center portion in the length direction of the thickness-direction first outer layer portion, and a thickness of a portion of the thickness-direction second outer layer portion adjacent to the second extension portion is larger than a thickness of a center portion in the length direction of the thickness-direction second outer layer portion. Where a bulging amount of the element body whose center portion along the length direction bulges to the outer side is defined as an element-body bulging amount M, a bulging amount of the element body whose center portion along the width direction bulges to the outer side is defined as element-body bulging amount N, a bulging amount of the multilayer portion whose center portion along the length direction bulges to the outer side is defined as a multilayer-portion bulging amount m, and a bulging amount of the multilayer portion whose center portion along the width direction bulges to the outer side is defined as a multilayer-portion bulging amount n. A number of stacked conductor layers is 300 or greater, the element-body bulging amount N and the multilayer-portion bulging amount n are about 20 μm or greater, respectively, and a relationship N>n is satisfied, and the element-body bulging amount M and the multilayer-portion bulging amount m are about 15 μm or greater, respectively, and a relationship M<m is satisfied.

In the above-described monolithic ceramic capacitor according to another preferred embodiment of the present invention, each of the plurality of ceramic dielectric layers preferably includes at least one of barium titanate, $CaZrO_3$, $CaTiO_3$, and $SrTiO_3$.

With various preferred embodiments of the present invention, monolithic ceramic capacitors with increased reliability and increased yield are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A and 7B are schematic cross-sectional views for describing a press-bonding step of a raw-material sheet group shown in FIG. 6.

FIG. 9 is a table showing design conditions and measured results of monolithic ceramic capacitors according to examples prototyped for a verification test.

DETAILED DESCRIPTION OF THE PREFERRED EMBODIMENTS

Figure 1:
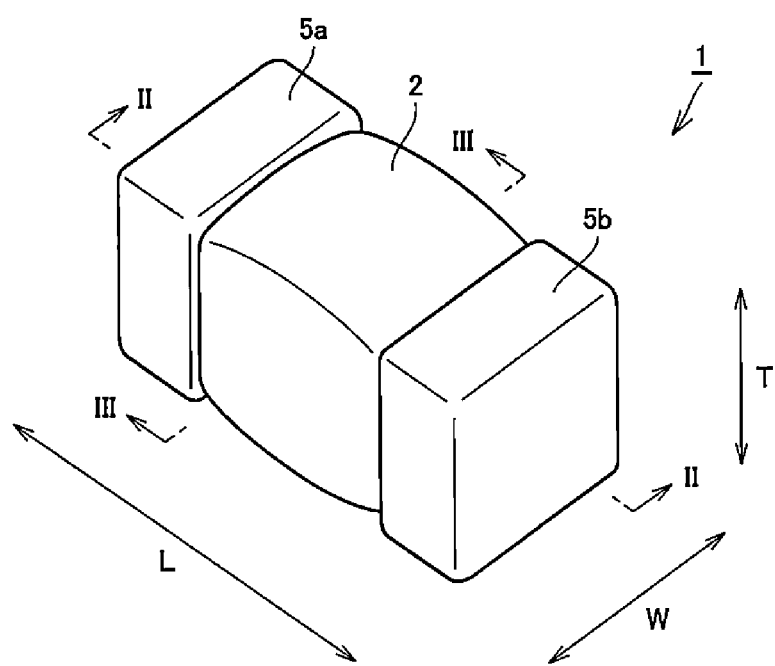
FIG. 1 is a brief perspective view of a monolithic ceramic capacitor according to a preferred embodiment of the present invention.

Preferred embodiments of the present invention will be described below in detail with reference to the drawings. In the following preferred embodiments, the same reference sign is applied to the same or common portion in the drawings, and the description is not repeated.

First Preferred Embodiment

FIG. 1 is a schematic perspective view of a monolithic ceramic capacitor according to a first preferred embodiment of the invention. Also, FIGS. 2 and 3 are schematic cross-sectional views taken along line II-II and line III-III in FIG. 1.

Figure 2:
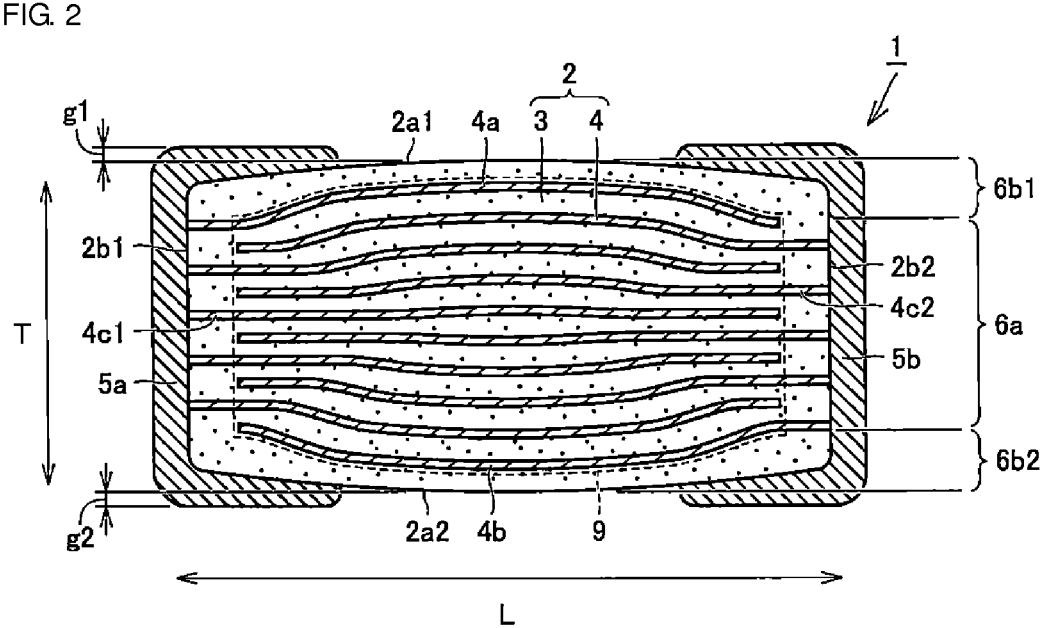
FIG. 2 is a schematic cross-sectional view taken along line II-II in FIG. 1.
Figure 3:
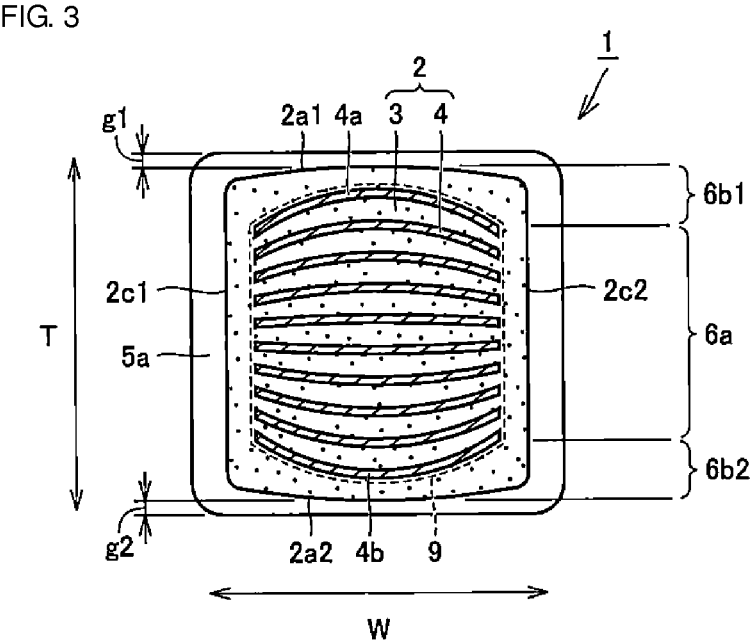
FIG. 3 is a schematic cross-sectional view taken along line III-III in FIG. 1.
Figure 4:
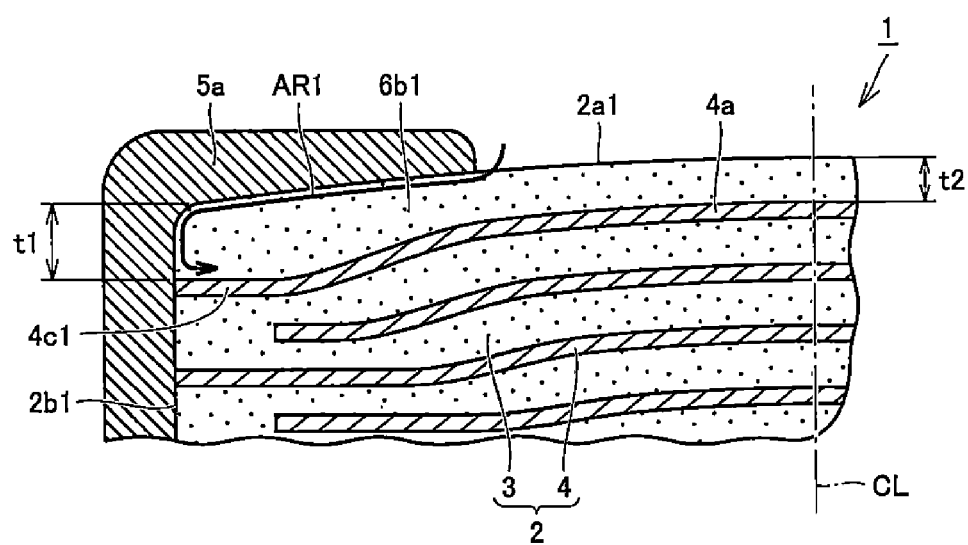
FIG. 4 is an enlarged view of a primary portion of the cross-section shown in FIG. 2.
Figure 5:
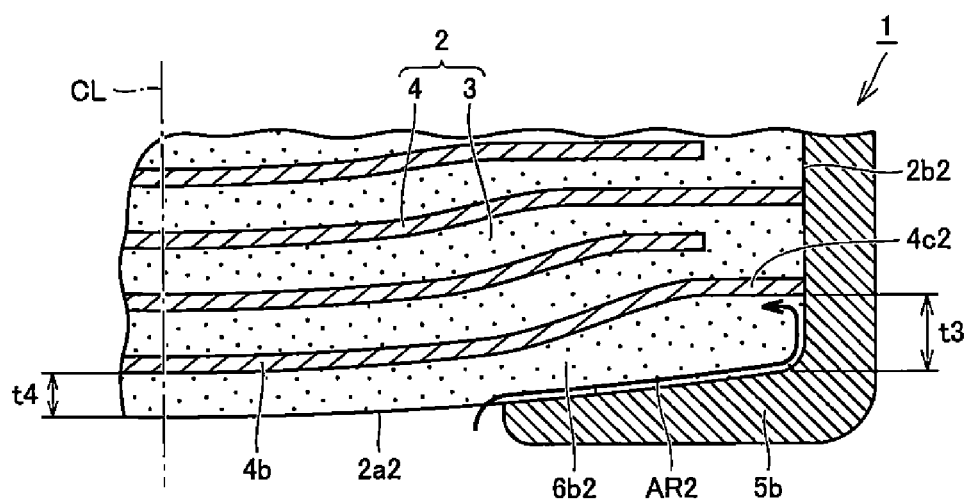
FIG. 5 is an enlarged view of a primary portion of the cross-section shown in FIG. 2.

FIGS. 4 and 5 are enlarged views of primary portions of the cross-section shown in FIG. 2. First, a configuration of a monolithic ceramic capacitor 1 according to this preferred embodiment is described with reference to FIGS. 1 to 5.

As shown in FIGS. 1 to 3, the monolithic ceramic capacitor 1 is an electronic component preferably having a rectangular or substantially rectangular-parallelepiped shape, and includes an element body 2, and a first outer electrode 5a and a second outer electrode 5b including a pair of outer electrodes.

As shown in FIGS. 2 and 3, the element body 2 preferably has a rectangular or substantially rectangular-parallelepiped shape, and includes ceramic dielectric layers 3 and inner electrode layers 4 defining and serving as conductor layers alternately stacked in a predetermined direction. The ceramic dielectric layers 3 are preferably made of a ceramic dielectric material containing, for example, barium titanate as the main constituent. Also, the ceramic dielectric layers 3 may include a Mn compound, a Mg compound, a Si compound, a Co compound, a Ni compound, a rare-earth compound, etc., as a sub-constituent of ceramic powder serving as a raw material of a ceramic green sheet (described later). In contrast, the inner electrode layers 4 are preferably made of a base metal material, such as Ni or Cu, as the main constituent.

The element body 2 is manufactured preferably by preparing a plurality of raw-material sheets, each of which is formed by printing a conductive pattern that becomes the inner electrode layer 4 on a surface of a ceramic green sheet that becomes the ceramic dielectric layer 3; manufacturing a mother block by stacking and press-bonding the plurality of raw-material sheets; individualizing the mother block into a plurality of multilayer chips by dividing the mother block; and then firing the multilayer chips.

The material of the ceramic dielectric layers 3 is not limited to the ceramic dielectric material containing the above-described barium titanate as the main constituent, and other ceramic dielectric material with a high dielectric constant (for example, a material containing $CaZrO_3$, $CaTiO_3$, $SrTiO_3$, or the like, as the main constituent) may be selected as the material of the ceramic dielectric layers 3. Also, the material of the inner electrode layers 4 is not limited to the above-described base metal material being the main constituent, and other conductor material may be selected as the material of the inner electrode layers 4.

As shown in FIGS. 1 and 2, the first outer electrode 5a and the second outer electrode 5b are separated from each other to cover outer surfaces located at both end portions in a predetermined direction of the element body 2. The first outer electrode 5a and the second outer electrode 5b are preferably made of conductive films.

The first outer electrode 5a and the second outer electrode 5b are each preferably made of a multilayer film including, for example, a sintered metal layer and a plated layer. For example, the sintered metal layer is preferably formed by sintering conductor paste, such as Cu, Ni, Ag, Pd, an Ag—Pd alloy, or Au, or conductive resin paste containing metal powder made of any of these materials. For example, the plated layer preferably includes a Ni plated layer and a Sn plated layer covering the Ni plated layer. Alternatively, the plated layer may be a Cu plated layer or an Au plated layer.

As shown in FIG. 2, one of a pair of the adjacent inner electrode layers 4 with the ceramic dielectric layer 3 interposed therebetween in a stack direction is connected with the first outer electrode 5a through a first extension portion 4c1 in the monolithic ceramic capacitor 1. The other of the pair of adjacent inner electrode layers 4 with the ceramic dielectric layer 3 interposed therebetween in the stack direction is connected with the second outer electrode 5b through a second extension portion 4c2 in the monolithic ceramic capacitor 1. Accordingly, a plurality of capacitor elements are electrically connected in parallel between the first outer electrode 5a and the second outer electrode 5b. The first extension portion 4c1 is a portion of the inner electrode layer 4 located between an effective region (that is, a region in which the plurality of inner electrode layers 4 are stacked in the stack direction, described later) and the first outer electrode 5a. The second extension portion 4c2 is a portion of the inner electrode layer 4 located between the effective region (described later) and the second outer electrode 5b.

As shown in FIGS. 2 and 3, in the monolithic ceramic capacitor 1 according to this preferred embodiment, a portion of the plurality of inner electrode layers 4 excluding the first extension portion 4c1 and the second extension portion 4c2 is an area that determines the capacity of the monolithic ceramic capacitor 1 (so-called effective region). A region including the portions of the plurality of inner electrode layers 4 that determine the capacity and the ceramic dielectric layers 3 interposed among the inner electrode layers 4 defines a multilayer portion 9, in which the ceramic dielectric layers 3 and the inner electrode layers 4 are densely stacked in a thickness direction.

With reference to FIGS. 1 to 3, for terms expressing the directions of the monolithic ceramic capacitor 1, the direction in which the ceramic dielectric layers 3 and the inner electrode layers 4 are stacked is defined as a thickness direction T, the direction in which the first outer electrode 5a and the second outer electrode 5b are arranged is defined as a length direction L, and the direction perpendicular or substantially perpendicular to both the thickness direction T and the length direction L is defined as a width direction W. These terms are used in the following description.

Also, with reference to FIGS. 2 and 3, among the six outer surfaces of the rectangular or substantially rectangular-parallelepiped-shaped element body 2, a pair of opposite outer surfaces arranged in the thickness direction T are respectively defined as a first principal surface 2a1 and a second principal surface 2a2, a pair of opposite outer surfaces arranged in the length direction L are respectively defined as a first end surface 2b1 and a second end surface 2b2, and a pair of opposite outer surfaces arranged in the width direction W are respectively defined as a first side surface 2c1 and a second side surface 2c2. These terms are used in the following description.

As shown in FIGS. 1 to 3, the monolithic ceramic capacitor 1 according to this preferred embodiment preferably has an elongated rectangular or substantially rectangular-parallelepiped shape configured such that the outside dimension in the length direction L is the longest. The representative values of the outside dimension in the length direction L and the outside dimension in the width direction W (the outside dimension in the thickness direction T is generally equivalent to the outside dimension in the width direction W) of the monolithic ceramic capacitor 1 may be, for example, about 3.2×1.6 mm, about 2.0×1.25 mm, about 1.6×0.8 mm, about 1.0×0.5 mm, about 0.8×0.4 mm, about 0.6×0.3 mm, about 0.4×0.2 mm, etc. The above-listed outside dimensions are each a numerical value based on the standard, and do not represent the actual size of the product.

As described above, the first outer electrode 5a and the second outer electrode 5b are preferably arranged to cover the outer surfaces located at both end portions in the predetermined direction of the element body 2. To be more specific, as shown in FIGS. 1 to 3, the first outer electrode 5a is arranged to cover the first end surface 2b1 of the element body 2, and portions of the first principal surface 2a1, the second principal surface 2a2, the first side surface 2c1, and the second side surface 2c2 located at a portion of the element body 2 near the first end surface 2b1; and the second outer electrode 5b is arranged to cover the second end surface 2b2 of the element body 2, and a portion of the first principal surface 2a1, the second principal surface 2a2, the first side surface 2c1, and the second side surface 2c2 located at a portion of the element body 2 near the second end surface 2b2. The portions of the first outer electrode 5a and the second outer electrode 5b provided on the first principal surface 2a1 and the second principal surface 2a2 have thicknesses preferably in a range from about 10 μm to about 30 μm, for example.

As shown in FIGS. 2 and 3, the element body 2 is divided into a thickness-direction inner layer portion 6a, a thickness-direction first outer layer portion 6b1, and a thickness-direction second outer layer portion 6b2 in the thickness direction T.

The thickness-direction inner layer portion 6a includes the multilayer portion 9, and includes the ceramic dielectric layers 3 and the inner electrode layers 4. Among these layers, the inner electrode layers 4 defining the thickness-direction inner layer portion 6a include a portion of the inner electrode layer 4 included in the multilayer portion 9, a portion of the inner electrode layer 4 extending from one portion of the portion of the inner electrode layer 4 included in the multilayer portion 9 toward the first end surface 2b1 side and hence defining the first extension portion 4c1 connected with the first outer electrode 5a, and a portion of the inner electrode layer 4 extending from another portion of the portion of the inner electrode layer 4 included in the multilayer portion 9 toward the second end surface 2b2 side and hence defining the second extension portion 4c2 connected with the second outer electrode 5b.

The thickness-direction first outer layer portion 6b1 includes the ceramic dielectric layer 3, and does not include the inner electrode layer 4. The thickness-direction first outer layer portion 6b1 covers a surface of the thickness-direction inner layer portion 6a at the side at which the first principal surface 2a1 is located. Hence, the thickness-direction first outer layer portion 6b1 determines the first principal surface 2a1 of the element body 2.

The thickness-direction second outer layer portion 6b2 includes the ceramic dielectric layer 3, and does not include the inner electrode layer 4. The thickness-direction second outer layer portion 6b2 covers a surface of the thickness-direction inner layer portion 6a at the side at which the second principal surface 2a2 is located. Hence, the thickness-direction second outer layer portion 6b2 determines the second principal surface 2a2 of the element body 2.

With this configuration, the thickness-direction inner layer portion 6a is arranged between the thickness-direction first outer layer portion 6b1 and the thickness-direction second outer layer portion 6b2 in the thickness direction T. Among the inner electrode layers 4 included in the thickness-direction inner layer portion 6a, a first outermost layer 4a defining and serving as a first conductor layer arranged at a position closest to the first principal surface 2a1 side is provided at a position adjacent to the ceramic dielectric layer 3 defining the above-described thickness-direction first outer layer portion 6b1. Among the inner electrode layers 4 included in the thickness-direction inner layer portion 6a, a second outermost layer 4b defining as a second conductor layer arranged at a position closest to the second principal surface 2a2 side is provided at a position adjacent to the ceramic dielectric layer 3 defining the above-described thickness-direction second outer layer portion 6b2.

As shown in FIGS. 1 and 2, in the monolithic ceramic capacitor 1 according to this preferred embodiment, center portions in the length direction L of both the first principal surface 2a1 and the second principal surface 2a2 preferably have bulging shapes bulging or protruding to the outer side so that the thickness of the element body 2 becomes maximum at a center portion in the length direction L and becomes minimum at both end portions in the length direction L. Also, due to the bulging shapes, in the monolithic ceramic capacitor 1 according to this preferred embodiment, each of the plurality of inner electrode layers 4 preferably has a curved shape curved in the length direction L so that a center portion in the length direction L of each of the plurality of inner electrode layers 4 becomes close to a closer one of the first principal surface 2a1 and the second principal surface 2a2.

Further, as shown in FIGS. 1 and 3, in the monolithic ceramic capacitor 1 according to this preferred embodiment, center portions in the width direction W of both the first principal surface 2a1 and the second principal surface 2a2 preferably have bulging shapes so that the thickness of the element body 2 becomes maximum at a center portion in the width direction W and becomes minimum at both end portions in the width direction W. Also, due to the bulging shapes, in the monolithic ceramic capacitor 1 according to this preferred embodiment, each of the plurality of inner electrode layers 4 has a curved shape curved in the width direction W so that a center portion in the width direction W of each of the plurality of inner electrode layers 4 becomes close to a closer one of the first principal surface 2a1 and the second principal surface 2a2.

That is, in the monolithic ceramic capacitor 1 according to this preferred embodiment, the center portions of the first principal surface 2a1 and the second principal surface 2a2 of the element body 2 preferably have mountain-shaped or substantially mountain-shaped configurations bulging or protruding to the outer side in plan view. Similarly, the center portion of each of the plurality of inner electrode layers 4 included in the element body 2 has a mountain-shaped or substantially mountain-shaped configuration bulging or protruding toward a closer one of the first principal surface 2a1 and the second principal surface 2a2 in plan view.

With this configuration, the plurality of inner electrode layers 4 each preferably have a curved shape in both the length direction L and the width direction W. Hence, as compared with a case in which the plurality of inner electrode layers 4 have substantially flat plate shapes, resistance to separation at the boundary portion between the inner electrode layer 4 and the ceramic dielectric layer 3 to reduce or prevent the occurrence of delamination, against a shear force, which may be generated between the inner electrode layer 4 and the ceramic dielectric layer 3, is increased. Accordingly, the occurrence of delamination is markedly reduced or prevented.

In addition, as shown in FIGS. 2 and 4, in the monolithic ceramic capacitor 1 according to this preferred embodiment, in any cross-section parallel to both the thickness direction T and the length direction L, the thickness of a portion of the thickness-direction first outer layer portion 6b1 adjacent to the first extension portion 4c1 of the first outermost layer 4a (that is, thickness t1 shown in FIG. 4) is larger than the thickness of a center portion in the length direction L of the thickness-direction first outer layer portion 6b1 (that is, thickness t2 of a portion in which a center line CL is located in the length direction L of the monolithic ceramic capacitor 1 shown in FIG. 4) (that is, t1>t2).

Also, similarly, as shown in FIGS. 2 and 5, in the monolithic ceramic capacitor 1 according to this preferred embodiment, in any cross-section parallel or substantially parallel to both the thickness direction T and the length direction L, the thickness of a portion of the thickness-direction second outer layer portion 6b2 adjacent to the second extension portion 4c2 of the second outermost layer 4b (that is, thickness t3 shown in FIG. 5) is larger than the thickness of a center portion in the length direction L of the thickness-direction second outer layer portion 6b2 (that is, thickness t4 of a portion in which the center line CL is located in the length direction L of the monolithic ceramic capacitor 1 shown in FIG. 5) (that is, t3>t4).

The insulation resistance value in the monolithic ceramic capacitor is decreased mainly because, when the element body 2 is immersed in solder liquid to apply metal-plating processing on a sintered metal layer previously formed on an outer surface of the element body 2 in a forming step of an outer electrode (described later), the moisture contained in the plating liquid enters an inner side portion of the element body 2 from an end surface of the portion in which the delamination of the element body 2 has occurred. To be more specific, the entry of the plating liquid occurs through the interface portion between the element body 2 and the sintered metal layer.

Also, the above-described decrease in insulation resistance value may also occur when adhesion between the sintered metal layer and the element body 2 is deteriorated with time and separation occurs therebetween. Hence, the moisture contained in the outside air enters the inner side portion of the element body 2 from the end surface of the portion in which the delamination of the element body 2 occurs.

In contrast, in the monolithic ceramic capacitor 1 according to this preferred embodiment, since the thickness t1 of the portion of the thickness-direction first outer layer portion 6b1 adjacent to the first extension portion 4c1 of the first outermost layer 4a is larger than the thickness t2 of the center portion in the length direction L of the thickness-direction first outer layer portion 6b1, and the thickness t3 of the portion of the thickness-direction second outer layer portion 6b2 adjacent to the second extension portion 4c2 of the second outermost layer 4b is larger than the thickness t4 of the center portion in the length direction L of the thickness-direction second outer layer portion 6b2, the above-described decrease in insulation resistance value is restricted.

That is, as shown in FIGS. 4 and 5, in the monolithic ceramic capacitor 1 according to this preferred embodiment, the shortest entry path of the above-described plating liquid or moisture to the element body 2 includes a path indicated by arrow AR1 in FIG. 4 and a path indicated by arrow AR2 in FIG. 5. To be more specific, the plating liquid or moisture reaches the first end surface 2b1 or the second end surface 2b2 from an edge of a portion of the first outer electrode 5a provided on the first principal surface 2a1 of the element body 2 or an edge of a portion of the second outer electrode 5b provided on the second principal surface 2a2 of the element body 2 through a boundary portion between the element body 2 and the first outer electrode 5a or a boundary portion between the element body 2 and the second outer electrode 5b, and if delamination occurs between the first extension portion 4c1 of the first outermost layer 4a or the second extension portion 4c2 of the second outermost layer 4b and a portion of the ceramic dielectric layer 3 adjacent thereto, the plating liquid or moisture enters the inner side portion of the element body 2 through the portion of the delamination.

Hence, with the above-described configuration, by an amount that the thickness t1 of the portion of the thickness-direction first outer layer portion 6b1 adjacent to the first extension portion 4c1 of the first outermost layer 4a is larger than the thickness t2 of the center portion in the length direction L of the thickness-direction first outer layer portion 6b1, or by an amount that the thickness t3 of the portion of the thickness-direction second outer layer portion 6b2 adjacent to the second extension portion 4c2 of the second outermost layer 4b is larger than the thickness t4 of the center portion in the length direction L of the thickness-direction second outer layer portion 6b2, the above-described shortest entry path of the plating liquid or moisture to the element body 2 becomes long.

Hence, the entry of the above-described plating liquid or moisture to the element body 2 is inhibited as compared with a case in which the thickness t1 and the thickness t2 are equivalent or the thickness t1 is smaller than the thickness t2, or a case in which the thickness t3 and the thickness t4 are equivalent or the thickness t3 is smaller than the thickness t4. The above-described decrease in insulation resistance value is restricted. The above-described difference between the thickness t1 and the thickness t2 and the difference between the thickness t3 and the thickness t4 are each preferably about 5 μm or larger, for example, in view of effectively restricting the decrease in insulation resistance value.

As described above, by providing or using the monolithic ceramic capacitor 1 according to this preferred embodiment, the occurrence of delamination is significantly reduced or prevented, and simultaneously the decrease in insulation resistance value between the inner electrode layers 4 is restricted. Consequently, monolithic ceramic capacitors with increased reliability and increased yield are provided.

Also, in the monolithic ceramic capacitor 1 according to this preferred embodiment, as described above, since the center portions of the first principal surface 2a1 and the second principal surface 2a2 of the element body 2 have mountain-shaped or substantially mountain-shaped configurations bulging or protruding to the outer side in plan view, a margin to increase the number of stacked inner electrode layers 4 is generated by the amount that the thickness of the center portion in the length direction L of the element body 2 is increased. By providing or using this configuration, a side effect of being advantageous to increase the capacity of the monolithic ceramic capacitor is also obtained.

Also, in the monolithic ceramic capacitor 1 according to this preferred embodiment, the first outer electrode 5a and the second outer electrode 5b have areas located at the outer side in the thickness direction T with respect to the portions of the first principal surface 2a1 and the second principal surface 2a2 corresponding to a maximum outside dimension in the thickness direction of the element body 2 (that is, the thickness of the center portion in the length direction L and the width direction W of the element body 2).

That is, as shown in FIGS. 2 and 3, in the monolithic ceramic capacitor 1 according to this preferred embodiment, the first outer electrode 5a and the second outer electrode 5b are configured so that exposed surfaces of portions of the first outer electrode 5a and the second outer electrode 5b covering the first principal surface 2a1 are located at the outer side by a predetermined distance g1 with respect to the center portion in plan view of the first principal surface 2a1 of the element body 2, and so that exposed surfaces of portions of the first outer electrode 5a and the second outer electrode 5b covering the second principal surface 2a2 are located at the outer side by a predetermined distance g2 with respect to the center portion in plan view of the second principal surface 2a2 of the element body 2.

With this configuration, when the monolithic ceramic capacitor 1 is mounted, the first principal surface 2a1 and the second principal surface 2a2 of the element body 2 are reliably prevented from contacting a mount surface of a printed wiring board. Mounting stability is thus ensured.

The outside shape and outside dimensions of the element body 2, the shape of the inner electrode layer 4 included in the element body 2, the thicknesses at specific areas of the thickness-direction first outer layer portion 6b1 and the thickness-direction second outer layer portion 6b2 included in the element body 2, the outside dimensions and thicknesses of the first outer electrode 5a and the second outer electrode 5b, etc., are determined by sealing the monolithic ceramic capacitor to be measured with sealing resin, exposing a specific cross-section by grinding the monolithic ceramic capacitor for each sealing resin, and observing the exposed cross-section by using an electron microscope (for example, scanning electron microscope (SEM)) or executing image processing.

The monolithic ceramic capacitor manufactured by a manufacturing method (described later) has a shape that bulges the most at a position on a segment connecting a center position of the first principal surface 2a1 and a center position of the second principal surface 2a2 of the element body 2. Hence, the peak of the bulging portion of the element body 2 and the peak of the bulging portion of the multilayer portion 9 may appear at this portion. Hence, to easily measure the bulging amount of the element body 2 and the bulging amount of the multilayer portion 9, the following measuring method may be used.

To measure the bulging amount in the length direction L, grinding is advanced in the width direction W so that an L-T cross-section parallel or substantially parallel to both the length direction L and the thickness direction T is exposed. The grinding is stopped when the grinding reaches the center position in the width direction W; and the above-described observation, image processing, etc., is executed based on the exposed cross-section at the time of stop. In particular, at this time, a reference position (first reference position) to measure the bulging amount of the element body 2 may be a boundary portion between a rounded ridge portion of the element body 2 and the first principal surface 2a1 and a boundary portion between a rounded ridge portion of the element body 2 and the second principal surface 2a2. Also, the distance from each boundary portion to the corresponding peak of the above-described bulging portion may be determined as the bulging amount in the length direction L.

To measure the bulging amount in the width direction W, grinding is advanced in the length direction L so that a W-T cross-section parallel or substantially parallel to both the width direction W and the thickness direction T is exposed. The grinding is stopped when the grinding reaches the center position in the length direction L, and the above-described observation, image processing, etc., is executed based on the exposed cross-section at the time of stop. In particular, at this time, a reference position (second reference position) to measure the bulging amount of the element body 2 may be a boundary portion between a rounded ridge portion of the element body 2 and the first principal surface 2a1 and a boundary portion between a rounded ridge portion of the element body 2 and the second principal surface 2a2. Also, the distance from each boundary portion to the corresponding peak of the above-described bulging portion may be determined as the bulging amount in the width direction W.

Figure 6:
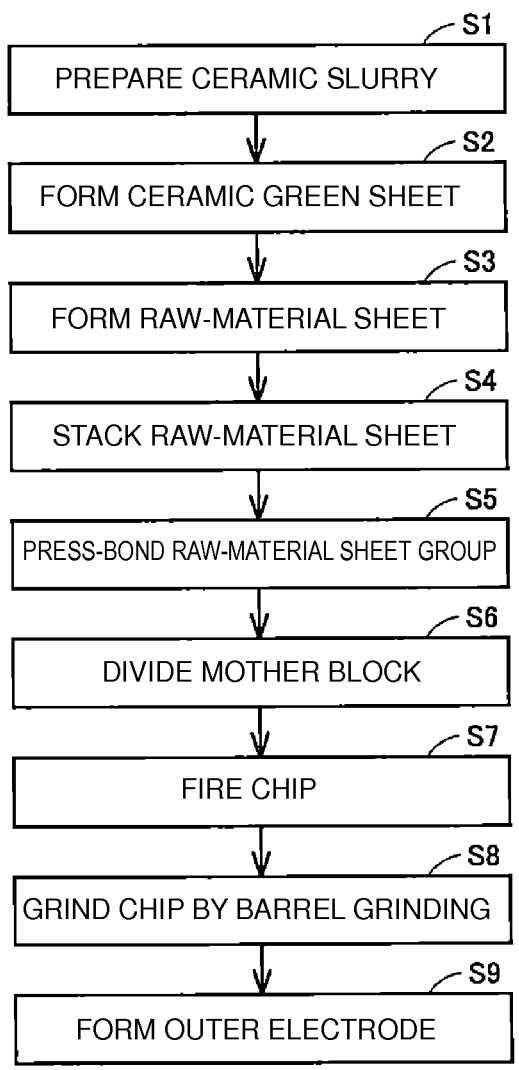
FIG. 6 is an illustration showing a manufacturing flow of the monolithic ceramic capacitor shown in FIG. 1.

Hereinafter, a non-limiting example of a specific manufacturing method for manufacturing the monolithic ceramic capacitor 1 with the above-described configuration is described. FIG. 6 is an illustration showing a manufacturing flow of the monolithic ceramic capacitor shown in FIG. 1. The manufacturing flow of the monolithic ceramic capacitor 1 described below is manufacturing a mother block by collectively executing processing until an intermediate phase of the manufacturing process, then dividing and individualizing the mother block, and further executing processing on the individualized chips, so that a plurality of the monolithic ceramic capacitors 1 are manufactured simultaneously by a large quantity.

As shown in FIG. 6, when the above-described monolithic ceramic capacitor 1 is manufactured, first, ceramic slurry is prepared (step S1). To be specific, ceramic powder, a binder, a solvent, etc., are mixed by a predetermined formulation ratio, and hence the ceramic slurry is formed.

Then, a ceramic green sheet is formed (step S2). To be specific, a ceramic green sheet 12 (see FIGS. 7A, 7B, 8A, and 8B) is manufactured by molding the ceramic slurry in a substantially sheet-like shape on a carrier film by using a die coater, a gravure coater, a microgravure coater, or the like.

Then, a raw-material sheet is formed (step S3). To be specific, the raw-material sheet with a predetermined conductive pattern 13 provided on the ceramic green sheet 12 is formed by printing the conductor paste on the ceramic green sheet 12 by screen printing or gravure printing so that the conductor paste has a predetermined pattern (see FIGS. 7A, 7B, 8A, and 8B).

In addition to the raw-material sheets having the above-described conductive patterns 13, raw-material sheets formed of only ceramic green sheets 12 manufactured without the step S3 are also prepared.

Then, the raw-material sheets are stacked (step S4). To be specific, the above-described plurality of raw-material sheets are stacked under a predetermined rule so that the plurality of conductive patterns 13 are arranged like an arrangement form of the inner electrode layers 4 shown in FIGS. 2 and 3 in the stacked raw-material sheet group 20 (see FIGS. 7A, 7B, 8A, and 8B).

Then, the raw-material sheet group is press-bonded (step S5). To be specific, the raw-material sheet group 20 is pressed in the stack direction by using, for example, hydrostatic pressing, and hence the row-material sheet group is press-bonded.

Figure 8A:
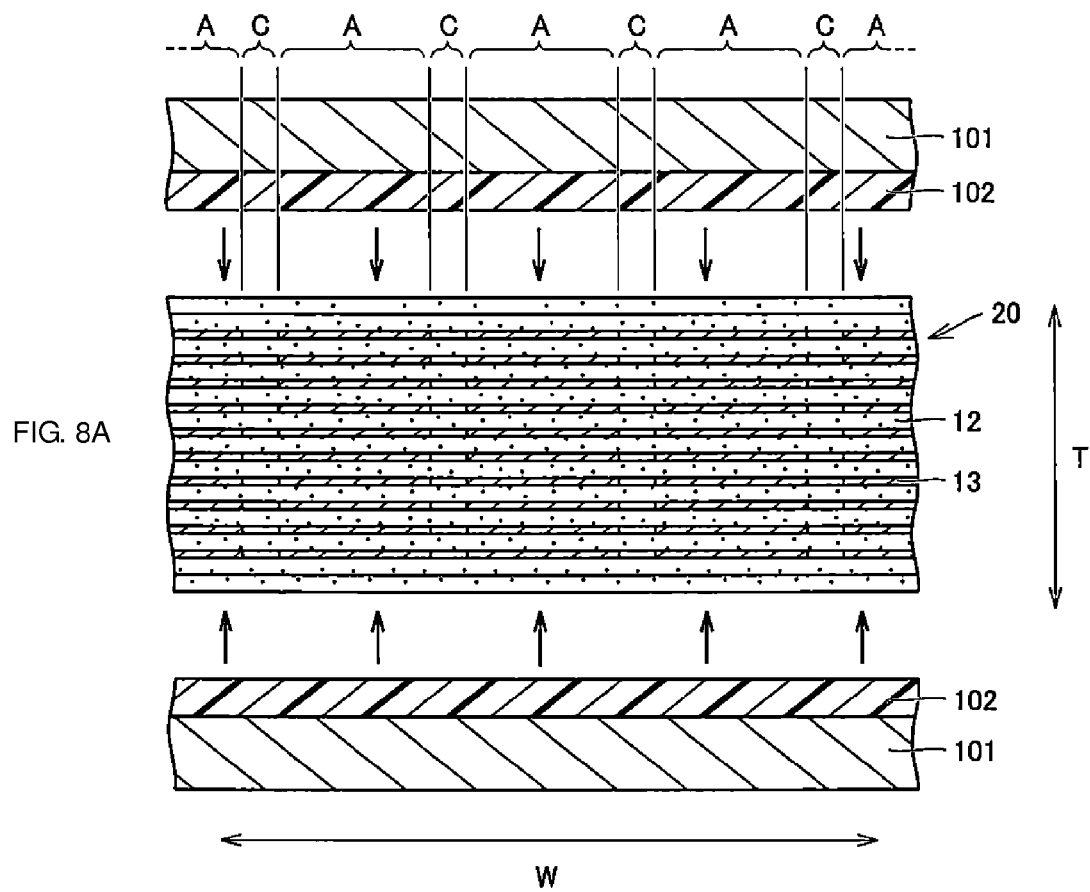
FIGS. 8A and 8B are schematic cross-sectional views for describing the press-bonding step of the raw-material sheet group shown in FIG. 6.
Figure 8B:
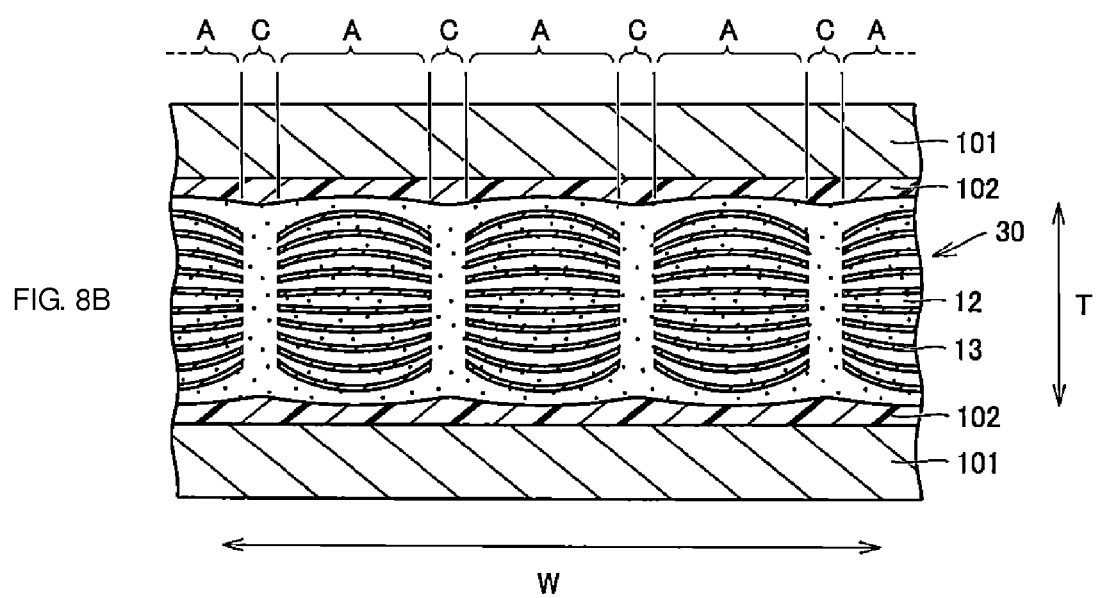

FIGS. 7A, 7B, 8A, and 8B are schematic cross-sectional views for describing the press-bonding step of the raw-material sheet group shown in FIG. 6. FIGS. 7A and 7B are cross-sectional views along the length direction L of the monolithic ceramic capacitor 1 to be manufactured. FIGS. 8A and 8B are cross-sectional views along the width direction W. Also, FIGS. 7A and 8A each show a state before the press-bonding, and FIGS. 7B and 8B each show a state after the press-bonding.

As shown in FIGS. 7A, 7B, 8A, and 8B, in the press-bonding step, the raw-material sheet group 20 stacked under the predetermined rule is sandwiched in the stack direction by a pair of pressure plates 101, a pressure is applied to the pressure plates 101 by hydrostatic pressure, and hence the raw-material sheet group 20 is press-bonded.

As shown in FIG. 7A, the raw-material sheet group 20 alternately has a region A in which many conductive patterns 13 are present and a region B in which a relatively small number of conductive patterns 13 are present. The region A in which the many conductive patterns 13 are present is an area that becomes a portion including the portions of the inner electrode layers 4 included in the multilayer portion 9 of the monolithic ceramic capacitor 1 when the monolithic ceramic capacitor 1 is completed. The region B in which the relatively small number of conductive patterns 13 are present is an area that becomes a portion including the portions of the inner electrode layers 4 that become the first extension portion 4c1 and the second extension portion 4c2 of the monolithic ceramic capacitor 1 when the monolithic ceramic capacitor 1 is completed.

In contrast, as shown in FIG. 8A, the raw-material sheet group 20 alternately includes a region A in which many conductive patterns 13 are present and a region C in which the conductive pattern 13 is not present. The region A in which the many conductive patterns 13 are present is an area that becomes a portion including the portions of the inner electrode layers 4 included in the multilayer portion 9 of the monolithic ceramic capacitor 1 when the monolithic ceramic capacitor 1 is completed. The region C in which the conductive pattern 13 is not present is an area that becomes both end portions in the width direction of the monolithic ceramic capacitor 1 when the monolithic ceramic capacitor 1 is completed.

A substantially sheet-shaped elastic body 102 is interposed between each of the pair of pressure plates 101 and the raw-material sheet group 20. The substantially sheet-shaped elastic body 102 adjusts the pressing force when the raw-material sheet group 20 is pressed by the pair of pressure plates 101 depending on the area. For example, the elastic body 102 made of polyethylene terephthalate (PET) resin may be used.

Since the ceramic green sheet 12 is formed of the ceramic dielectric material, the ceramic green sheet 12 is relatively soft and easily pressed. In contrast, since the conductive pattern 13 is formed of the conductor material, the conductive pattern 13 is relatively hard and hardly pressed. Also, in the region A, the many conductive patterns are densely present, and in the regions B and C, the conductive pattern 13 is not present, or even if the conductive pattern 13 is present, the number of conductive patterns 13 is smaller than that of the region A. Hence, the region A is relatively hardly pressed, and the regions B and C are relatively easily pressed.

As described above, the substantially sheet-shaped elastic body 102 is interposed between each of the pair of pressure plates 101 and the raw-material sheet group 20 and the press-bonding is executed. Accordingly, since the elastic body 102 is elastically deformed during the press-bonding, the pressing force is adjustable according the area.

Accordingly, when the monolithic ceramic capacitor 1 is completed, the first principal surface 2a1 and the second principal surface 2a2 preferably include the bulging shapes bulging to the outer side at the center portions in both the length direction L and the width direction W. Also, the plurality of inner electrode layers 4 preferably have curved shapes at the center portions in both the length direction L and the width direction W.

Further, since the elastic body 102 is elastically deformed during the press-bonding, a portion of the ceramic dielectric material of a portion located at the surface layer of the region A easily flows toward the region B and the region C. Accordingly, when the monolithic ceramic capacitor 1 is completed, the thickness t1 of the portion of the thickness-direction first outer layer portion 6b1 adjacent to the first extension portion 4c1 preferably is larger than the thickness t2 of the center portion in the length direction L of the thickness-direction first outer layer portion 6b1. Also, the thickness t3 of the portion of the thickness-direction second outer layer portion 6b2 adjacent to the second extension portion 4c2 preferably is larger than the thickness t4 of the center portion in the length direction L of the thickness-direction second outer layer portion 6b2.

In this way, after the press-bonding, a mother block 30 having a shape shown in FIG. 7B and FIG. 8B is manufactured.

The magnitude of the pressing force during the press-bonding of the raw-material sheet group 20 is capable of being properly changed. Preferably, a pressure of about 50 MPa, for example, may be applied to the entire raw-material sheet group 20. Also, the thickness of the elastic body 102 is preferably in a range from about 20 μm to about 100 μm, and more preferably, about 100 μm, for example. By changing the pressing force and the thickness of the elastic body 102 in various manners, the bulging shape of the element body 2 and the curved shape of the inner electrode layer 4 described above can be adjusted in various manners.

Then, the mother block is divided (step S6). To be specific, press-cutting or dicing is performed and hence the mother block is divided into a matrix form along the above-described regions B and C. Hence, the above-described chips are cut.

Then, the chip is fired (step S7). To be specific, each cut chip is heated at a predetermined temperature, and hence the ceramic dielectric material and the conductor material are sintered.

Then, the chip is grinded by barrel grinding (step S8). To be specific, the chip after the sintering is sealed in a small box called barrel with medium balls with a higher hardness than the hardness of the ceramic material, the barrel is rotated, and hence the chip is grinded. Accordingly, the outer surfaces (in particular, an edge portion and a corner portion) of the chip are rounded. Hence the above-described element body 2 is formed.

Then, an outer electrode is formed (step S9). To be specific, metal films are formed by applying the conductor paste on an end portion of a portion including the first end surface 2b1 and an end portion of a portion including the second end surface 2b2 of the element body 2, the formed metal films are sintered, and then Ni plating and Sn plating are successively applied to the metal films. Accordingly, the first outer electrode 5a and the second outer electrode 5b are formed on the outer surfaces of the element body 2.

By performing the above-described series of steps, the manufacturing of the monolithic ceramic capacitor 1 having the structure shown in FIGS. 1 to 3 is completed.

Figure 10A:
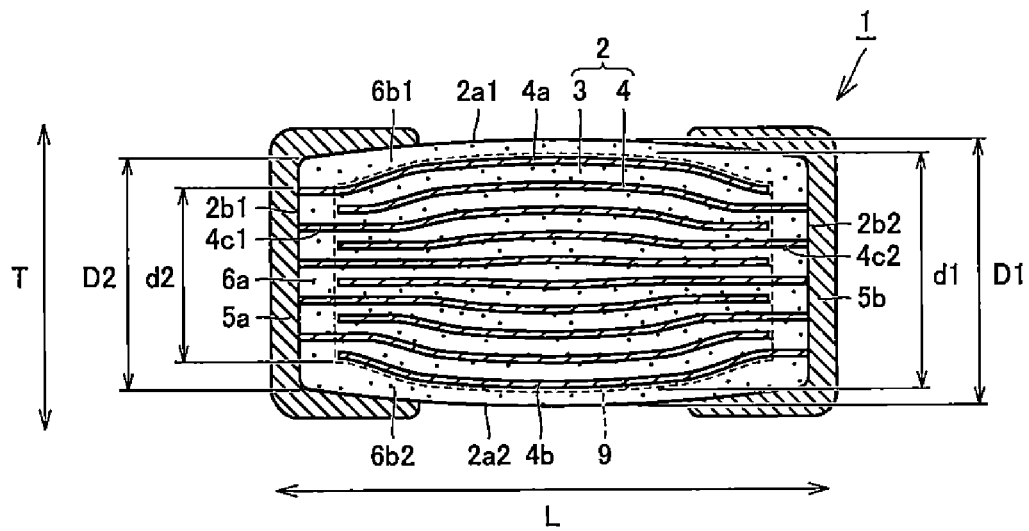
FIGS. 10A and 10B are schematic cross-sectional views each showing a monolithic ceramic capacitor according to an example.
Figure 10B:
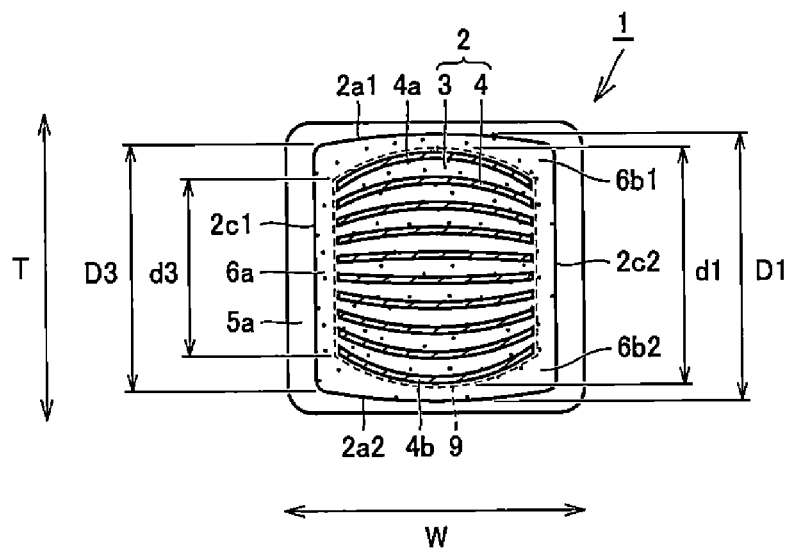

Described next is a result of a verification test, in which a prototype of the monolithic ceramic capacitor 1 according to various preferred embodiments of the present invention was manufactured and it was verified whether or not delamination occurs. FIG. 9 is a table showing design conditions and measured results of monolithic ceramic capacitors according to examples prototyped for the verification test. FIGS. 10A and 10B are schematic cross-sectional views of the monolithic ceramic capacitor according to the examples.

In the verification test, as Example 1, 20 monolithic ceramic capacitors were manufactured, each of the monolithic ceramic capacitors including an element body having design values of the size of 0.4-mm length, 0.2-mm width, and 0.2-mm thickness, and having a design value of the electrostatic capacity value being 0.22 μF. As Example 2, 20 monolithic ceramic capacitors were manufactured, each of the monolithic ceramic capacitors including an element body having design values of the size of 0.6-mm length, 0.3-mm width, and 0.3-mm thickness, and having a design value of the electrostatic capacity value being 2.2 μF. As Example 3, 20 monolithic ceramic capacitors were manufactured, each of the monolithic ceramic capacitors including an element body having design values of the size of 1.0-mm length, 0.5-mm width, and 0.5-mm thickness, and having a design value of the electrostatic capacity value being 10 μF.

The design value of the distance between the inner electrode layers (that is, the thickness of the dielectric layer), the design value of the thickness of the inner electrode layer, and the number of stacked inner electrode layers for each of the monolithic ceramic capacitors according to Examples 1 to 3 are as described in FIG. 9. In a case where an element body has dimensions of about 0.4 mm length, about 0.2 mm width and about 0.2 mm thickness, for example, the number of stacked inner electrode layers is preferably 140 or greater, for example. In a case where an element body has dimensions of about 0.6 mm length, about 0.3 mm width and about 0.3 mm thickness, for example, the number of stacked inner electrode layers is preferably 200 or greater, for example. In a case where an element body has dimensions of about 1.0 mm length, about 0.5 mm width and about 0.5 mm thickness, for example, the number of stacked inner electrode layers is preferably 300 or greater, for example.

Also, in the monolithic ceramic capacitor according to Example 1, press-bonding of a raw-material sheet group was executed by using the press-bonding method using the above-described elastic body. Accordingly, it was recognized that in the monolithic ceramic capacitor according to Example 1, the thicknesses t1 and t3 of the thickness-direction first outer layer portion 6b1 and the thickness-direction second outer layer portion 6b2 were each 20 μm, and the thicknesses t2 and t4 of the thickness direction first outer layer portion 6b1 and the thickness-direction second outer layer portion 6b2 were each 15 μm. The measured values of various dimensions of the monolithic ceramic capacitors according to Examples 1 to 3 (each value is an average value of 20 samples) were as described in FIG. 9. The respective dimensions were measured according to the above-described measuring method.

Among the measured values shown in FIG. 9, element-body thicknesses D1 to D3 and multilayer-portion thicknesses d1 to d3 are measured values of the dimensions of portions shown in FIGS. 10A and 10B. Among these values, the element-body thickness D1 and the multilayer-portion thickness d1 are measured values of thicknesses at the center positions in the length direction L and the width direction W, the element-body thickness D2 and the multilayer-portion thickness d2 are measured values of thicknesses at end-portion positions in the length direction L (that is, the above-described first reference position), and the element-body thickness D3 and the multilayer-portion thickness d3 are measured values of the thicknesses at end-portion positions in the width direction W (that is, the above-described second reference position).

Also, among the measured values shown in FIG. 9, both the element-body bulging amounts M and N, and both the multilayer-portion bulging amounts m and n are bulging amounts at one side in the thickness direction T, and are calculated based on respective expressions of $M=(D1-D2)/2$, $N=(D1-D3)/2$, $m=(d1-d2)/2$, and $n=(d1-d3)/2$. That is, the element-body bulging amount M and the multilayer-portion bulging amount m respectively represent bulging amounts of the element body 2 and the multilayer portion 9 in the length direction L. The element-body bulging amount N and the multilayer-portion bulging amount n respectively represent bulging amounts of the element body 2 and the multilayer portion 9 in the width direction W. In a case where the element body has dimensions of about 0.4 mm length, about 0.2 mm width and about 0.2 mm thickness, for example, the element-body bulging amount N and the multilayer-portion bulging amount n are preferably about 10 μm or greater, respectively, and the relationship N>n is preferably satisfied, and the element-body bulging amount M and the multilayer-portion bulging amount m are preferably about 10 μm or greater, respectively, and the relationship M<m is preferably satisfied, for example. In a case where the element body has dimensions of about 0.6 mm length, about 0.3 mm width and about 0.3 mm thickness, for example, the element-body bulging amount N and the multilayer-portion bulging amount n are preferably about 14 μm or greater, respectively, and the relationship N>n is preferably satisfied, and the element-body bulging amount M and the multilayer-portion bulging amount m are preferably about 15 μm or greater, respectively, and the relationship M<m is preferably satisfied, for example. In a case where the element body has dimensions of about 1.0 mm length, about 0.5 mm width and about 0.5 mm thickness, for example, the element-body bulging amount N and the multilayer-portion bulging amount n are preferably about 20 μm or greater, respectively, and the relationship N>n is preferably satisfied, and the element-body bulging amount M and the multilayer-portion bulging amount m are preferably about 15 μm or greater, respectively, and the relationship M<m is preferably satisfied, for example.

As shown in FIG. 9, in each of the monolithic ceramic capacitors according to Examples 1 to 3, the element-body bulging amount N is larger than the element-body bulging amount M. This is more apparent in terms of the bulging degree of the bulging portion of the element body 2 in the direction along the width direction W rather than the direction along the length direction L. Meanwhile, in each of the monolithic ceramic capacitors according to Examples 1 to 3, the multilayer-portion bulging amount m is larger than the multilayer-portion bulging amount n. This is more apparent in terms of the bulging degree of the bulging portion of the multilayer portion 9 in the direction along the length direction L rather than the direction along the width direction W.

With regard to the above-described results of the measured values and the presence of the decrease in insulation resistance value caused by delamination (described later), to reduce or prevent the occurrence of delamination, the following consideration is established.

That is, in the monolithic ceramic capacitor including the element body having the design values of the size of 0.4-mm length, 0.2-mm width, and 0.2-mm thickness, having the design value of the electrostatic capacity value being 0.22 μF, and having the design values of the thicknesses of the thickness-direction first outer layer portion 6b1 and the thickness-direction second outer layer portion 6b2 being each 12 μm or larger, the occurrence of delamination is markedly reduced if both the element-body bulging amounts M and N, and both the multilayer-portion bulging amounts m and n are about 10 μm or larger, for example.

Also, in the monolithic ceramic capacitor including the element body having the design values of the size of 0.6-mm length, 0.3-mm width, and 0.3-mm thickness, having the design value of the electrostatic capacity value being 2.2 μF, and having the design values of the thicknesses of the thickness-direction first outer layer portion 6b1 and the thickness-direction second outer layer portion 6b2 being each 15 μm or larger, the occurrence of delamination is markedly reduced if both the element-body bulging amounts M and N, and both the multilayer-portion bulging amounts m and n are about 15 μm or larger, for example.

Further, in the monolithic ceramic capacitor including the element body having the design values of the size of 1.0-mm length, 0.5-mm width, and 0.5-mm thickness, having the design value of the electrostatic capacity value being 10 μF, and having the design values of the thicknesses of the thickness-direction first outer layer portion 6b1 and the thickness-direction second outer layer portion 6b2 being each 20 μm or larger, the occurrence of delamination is markedly reduced if both the element-body bulging amounts M and N, and both the multilayer-portion bulging amounts m and n are about 18 μm or larger, for example.

In contrast, for comparison, 20 monolithic ceramic capacitors were manufactured for each of Comparative Examples 1 to 3, each monolithic ceramic capacitor being formed by press-bonding a raw-material sheet group with uniform pressure by using a pair of pressure plates without the press-bonding method using the above-described elastic body. The manufacturing conditions of the monolithic ceramic capacitors according to Comparative Examples 1 to 3 are the same as the monolithic ceramic capacitors according to Examples 1 to 3 except that the press-bonding condition is different. That is, the monolithic ceramic capacitors according to Comparative Examples 1 to 3 were manufactured so as not to satisfy the conditions of the bulging amounts based on the above-described consideration. Accordingly, it was recognized that in the monolithic ceramic capacitor according to Comparative Example 1, both the thicknesses t1 and t3 of the thickness-direction first outer layer portion 6b1 and the thickness-direction second outer layer portion 6b2 were equivalent to the thicknesses t2 and t4 of the thickness direction first outer layer portion 6b1 and the thickness-direction second outer layer portion 6b2.

Further, for each of the monolithic ceramic capacitors according to Examples 1 to 3 and Comparative Examples 1 to 3, it was checked whether or not the insulation resistance value was decreased because of the delamination, by using a supersonic microscope. As the result, in the monolithic ceramic capacitors according to Examples 1 to 3, the decrease in insulation resistance value because of the delamination was not found in any of the manufactured 20 monolithic ceramic capacitors. In the monolithic ceramic capacitors according to Comparative Examples 1 to 3, the decrease in insulation resistance value because of the delamination was found in two of each 20 monolithic ceramic capacitors.

One of the two monolithic ceramic capacitors according to each of Comparative Examples 1 to 3 in which the decrease in insulation resistance value because of the delamination was found was grinded in the width direction W so that the L-T cross-section was exposed according to the above-described measuring method, and the cross-section was observed. Then, it was recognized that the element-body bulging amount M and the multilayer-portion bulging amount m do not reach sufficient amounts (bulging amounts based on the above-described consideration).

The other of the two monolithic ceramic capacitors according to each of Comparative Examples 1 to 3 in which the decrease in insulation resistance value because of the delamination was found was grinded in the length direction L so that the W-T cross-section was exposed according to the above-described measuring method, and the cross-section was observed. Then, it was recognized that the element-body bulging amount N and the multilayer-portion bulging amount n do not reach sufficient amounts (bulging amounts based on the above-described consideration).

Hence, also in this point of view, it was ensured that the bulges in the thickness direction T of the element body 2 and the multilayer portion 9 along the length direction L and the width direction W (that is, mountain-shaped bulges or protrusions) make a large contribution to the reduction in occurrence of delamination.

To ensure appropriateness of the verification test described above, the verification test was executed again under similar test conditions; however, the similar result was obtained.

Regarding the above-described results, with the monolithic ceramic capacitor according to any of the examples, it was experimentally confirmed that the monolithic ceramic capacitors having increased reliability and increased yield are provided.

In the above-described preferred embodiments of the invention, the center portions in both the length direction L and the width direction W of the first principal surface 2a1 and the second principal surface 2a2 of the element body 2 preferably have the bulging shapes bulging to the outer side, and the center portions in both the length direction L and the width direction W of the plurality of inner electrode layers 4 preferably have the curved shapes. Alternatively, only the center portions in the length direction L of the first principal surface 2a1 and the second principal surface 2a2 of the element body 2 may bulge to the outer side, and only the center portions in the length direction L of the plurality of inner electrode layers 4 may be curved to the outer side, for example. Even in this case, advantages similar to those of the above-described preferred embodiments of the present invention are obtained.

Also, in the above-described preferred embodiments of the invention, for example, the monolithic ceramic capacitor preferably is configured such that both the first principal surface 2a1 and the second principal surface 2a2 of the element body 2 include the bulging shapes bulging to the outer side. Alternatively, a monolithic ceramic capacity may be configured such that only one of the first principal surface 2a1 and the second principal surface 2a2 of the element body 2 has a bulging shape bulging to the outer side, for example. The monolithic ceramic capacitor having the element body 2 with such a shape preferably is manufactured by arranging the elastic body 102 between only one of the pair of pressure plates 101 and the raw-material sheet group 20, and not arranging the elastic body 102 between the other one of the pair of pressure plates 101 and the raw-material sheet group 20 in the above-described press-bonding step. In this case, both the plurality of inner electrode layers 4 preferably have curved shapes that protrude toward only one of the principal surfaces side. Even in this case, advantages similar to those of the above-described preferred embodiment are obtained by a certain degree.

The above-described preferred embodiments currently disclosed are merely examples, and do not limit the present invention. The technical scope of the present invention is defined by the claims and includes meaning equivalent to the description of the claims and all modifications within the scope.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic ceramic capacitor comprising:
   an element body including therein a multilayer portion including a plurality of conductor layers and a plurality of ceramic dielectric layers alternately stacked in a thickness direction; and
   an outer electrode provided on an outer portion of the element body; wherein
   the capacitor has dimensions of about 0.4 mm length, about 0.2 mm width and about 0.2 mm thickness;
   outer surfaces of the element body include a first principal surface and a second principal surface opposed in the thickness direction, a first end surface and a second end surface opposed in a length direction perpendicular or substantially perpendicular to the thickness direction, and a first side surface and a second side surface opposed in a width direction perpendicular or substantially perpendicular to both the thickness direction and the length direction;

the outer electrode includes a first outer electrode arranged to cover the first end surface, and a second outer electrode arranged to cover the second end surface;

the element body is divided in the thickness direction into a thickness-direction first outer layer portion that includes the ceramic dielectric layer and defines the first principal surface, a thickness-direction second outer layer portion that includes the ceramic dielectric layer and defines the second principal surface, and a thickness-direction inner layer portion including the multilayer portion and located between the thickness-direction first outer layer portion and the thickness-direction second outer layer portion;

among the plurality of conductor layers included in the thickness-direction inner layer portion, a first conductor layer arranged at a position closest to the first principal surface is provided at a position adjacent to the ceramic dielectric layer defining the thickness-direction first outer layer portion;

among the plurality of conductor layers included in the thickness-direction inner layer portion, a second conductor layer arranged at a position closest to the second principal surface is provided at a position adjacent to the ceramic dielectric layer defining the thickness-direction second outer layer portion;

one portion of the plurality of conductor layers including the first conductor layer is connected with the first outer electrode through a first extension portion extending from the multilayer portion toward the first end surface side;

another portion of the plurality of conductor layers including the second conductor layer is connected with the second outer electrode through a second extension portion extending from the multilayer portion toward the second end surface side;

center portions in the length direction of both the first principal surface and the second principal surface bulge to an outer side so that a thickness of the element body is minimum at both end portions in the length direction;

each of the plurality of conductor layers has a curved shape in the length direction so that a center portion in the length direction of each of the plurality of conductor layers is close to a closer one of the first principal surface and the second principal surface;

center portions in the width direction of both the first principal surface and the second principal surface bulge to the outer side so that the thickness of the element body is minimum at both end portions in the width direction;

each of the plurality of conductor layers has a curved shape in the width direction so that a center portion in the width direction of each of the plurality of conductor layers is close to a closer one of the first principal surface and the second principal surface;

in any cross-section parallel or substantially parallel to both the thickness direction and the length direction, a thickness of a portion of the thickness-direction first outer layer portion adjacent to the first extension portion is larger than a thickness of a center portion in the length direction of the thickness-direction first outer layer portion, and a thickness of a portion of the thickness-direction second outer layer portion adjacent to the second extension portion is larger than a thickness of a center portion in the length direction of the thickness-direction second outer layer portion;

where a bulging amount of the element body whose center portion along the length direction bulges to the outer side is defined as an element-body bulging amount M, a bulging amount of the element body whose center portion along the width direction bulges to the outer side is defined as an element-body bulging amount N, a bulging amount of the multilayer portion whose center portion along the length direction bulges to the outer side is defined as a multilayer-portion bulging amount m, and a bulging amount of the multilayer portion whose center portion along the width direction bulges to the outer side is defined as a multilayer-portion bulging amount n;

a number of stacked conductor layers is 140 or greater, the element-body bulging amount N and the multilayer-portion bulging amount n are about 10 μm or greater, respectively, and a relationship N>n is satisfied, and the element-body bulging amount M and the multilayer-portion bulging amount m are about 10 μm or greater, respectively, and a relationship M<m is satisfied.

2. The monolithic ceramic capacitor according to claim 1, wherein each of the plurality of ceramic dielectric layers includes at least one of barium titanate, $CaZrO_3$, $CaTiO_3$, and $SrTiO_3$.

3. A monolithic ceramic capacitor comprising:

an element body including therein a multilayer portion including a plurality of conductor layers and a plurality of ceramic dielectric layers alternately stacked in a thickness direction; and an outer electrode provided on an outer portion of the element body; wherein the capacitor has dimensions of about 0.6 mm length, about 0.3 mm width and about 0.3 mm thickness;

outer surfaces of the element body include a first principal surface and a second principal surface opposed in the thickness direction, a first end surface and a second end surface opposed in a length direction perpendicular or substantially perpendicular to the thickness direction, and a first side surface and a second side surface opposed in a width direction perpendicular or substantially perpendicular to both the thickness direction and the length direction;

the outer electrode includes a first outer electrode arranged to cover the first end surface, and a second outer electrode arranged to cover the second end surface;

the element body is divided in the thickness direction into a thickness-direction first outer layer portion that includes the ceramic dielectric layer and defines the first principal surface, a thickness-direction second outer layer portion that includes the ceramic dielectric layer and defines the second principal surface, and a thickness-direction inner layer portion including the multilayer portion and located between the thickness-direction first outer layer portion and the thickness-direction second outer layer portion;

among the plurality of conductor layers included in the thickness-direction inner layer portion, a first conductor layer arranged at a position closest to the first principal surface is provided at a position adjacent to the ceramic dielectric layer defining the thickness-direction first outer layer portion;

among the plurality of conductor layers included in the thickness-direction inner layer portion, a second conductor layer arranged at a position closest to the second principal surface is provided at a position adjacent to the ceramic dielectric layer defining the thickness-direction second outer layer portion;

one portion of the plurality of conductor layers including the first conductor layer is connected with the first outer electrode through a first extension portion extending from the multilayer portion toward the first end surface side;

another portion of the plurality of conductor layers including the second conductor layer is connected with the second outer electrode through a second extension portion extending from the multilayer portion toward the second end surface side;

center portions in the length direction of both the first principal surface and the second principal surface bulge to an outer side so that a thickness of the element body is minimum at both end portions in the length direction;

each of the plurality of conductor layers has a curved shape in the length direction so that a center portion in the length direction of each of the plurality of conductor layers is close to a closer one of the first principal surface and the second principal surface;

center portions in the width direction of both the first principal surface and the second principal surface bulge to the outer side so that the thickness of the element body is minimum at both end portions in the width direction;

each of the plurality of conductor layers has a curved shape in the width direction so that a center portion in the width direction of each of the plurality of conductor layers is close to a closer one of the first principal surface and the second principal surface;

in any cross-section parallel or substantially parallel to both the thickness direction and the length direction, a thickness of a portion of the thickness-direction first outer layer portion adjacent to the first extension portion is larger than a thickness of a center portion in the length direction of the thickness-direction first outer layer portion, and a thickness of a portion of the thickness-direction second outer layer portion adjacent to the second extension portion is larger than a thickness of a center portion in the length direction of the thickness-direction second outer layer portion;

where a bulging amount of the element body whose center portion along the length direction bulges to the outer side is defined as an element-body bulging amount M, a bulging amount of the element body whose center portion along the width direction bulges to the outer side is defined as an element-body bulging amount N, a bulging amount of the multilayer portion whose center portion along the length direction bulges to the outer side is defined as a multilayer-portion bulging amount m, and a bulging amount of the multilayer portion whose center portion along the width direction bulges to the outer side is defined as a multilayer-portion bulging amount n; and a number of stacked conductor layers is 200 or greater, the element-body bulging amount N and the multilayer-portion bulging amount n are about 14 μm or greater, respectively, and a relationship N>n is satisfied, and the element-body bulging amount M and the multilayer-portion bulging amount m are about 15 μm or greater, respectively, and a relationship M<m is satisfied.

4. The monolithic ceramic capacitor according to claim 3, wherein each of the plurality of ceramic dielectric layers includes at least one of barium titanate, $CaZrO_3$, $CaTiO_3$, and $SrTiO_3$.

5. A monolithic ceramic capacitor comprising:
an element body including therein a multilayer portion including a plurality of conductor layers and a plurality of ceramic dielectric layers alternately stacked in a thickness direction; and an outer electrode provided on an outer portion of the element body; wherein the capacitor has dimensions of about 1.0 mm length, about 0.5 mm width and about 0.5 mm thickness;

outer surfaces of the element body include a first principal surface and a second principal surface opposed in the thickness direction, a first end surface and a second end surface opposed in a length direction perpendicular or substantially perpendicular to the thickness direction, and a first side surface and a second side surface opposed in a width direction perpendicular or substantially perpendicular to both the thickness direction and the length direction;

the outer electrode includes a first outer electrode arranged to cover the first end surface, and a second outer electrode arranged to cover the second end surface;

the element body is divided in the thickness direction into a thickness-direction first outer layer portion that includes the ceramic dielectric layer and defines the first principal surface, a thickness-direction second outer layer portion that includes the ceramic dielectric layer and defines the second principal surface, and a thickness-direction inner layer portion including the multilayer portion and located between the thickness-direction first outer layer portion and the thickness-direction second outer layer portion;

among the plurality of conductor layers included in the thickness-direction inner layer portion, a first conductor layer arranged at a position closest to the first principal surface is provided at a position adjacent to the ceramic dielectric layer defining the thickness-direction first outer layer portion;

among the plurality of conductor layers included in the thickness-direction inner layer portion, a second conductor layer arranged at a position closest to the second principal surface is provided at a position adjacent to the ceramic dielectric layer defining the thickness-direction second outer layer portion;

one portion of the plurality of conductor layers including the first conductor layer is connected with the first outer electrode through a first extension portion extending from the multilayer portion toward the first end surface side;

another portion of the plurality of conductor layers including the second conductor layer is connected with the second outer electrode through a second extension portion extending from the multilayer portion toward the second end surface side;

center portions in the length direction of both the first principal surface and the second principal surface bulge to an outer side so that a thickness of the element body is minimum at both end portions in the length direction;

each of the plurality of conductor layers has a curved shape in the length direction so that a center portion in the length direction of each of the plurality of conductor layers is close to a closer one of the first principal surface and the second principal surface;

center portions in the width direction of both the first principal surface and the second principal surface bulge to the outer side so that the thickness of the element body is minimum at both end portions in the width direction;

each of the plurality of conductor layers has a curved shape in the width direction so that a center portion in the width direction of each of the plurality of conductor layers is close to a closer one of the first principal surface and the second principal surface;

in any cross-section parallel or substantially parallel to both the thickness direction and the length direction, a thickness of a portion of the thickness-direction first outer layer portion adjacent to the first extension portion is larger than a thickness of a center portion in the length direction of the thickness-direction first outer layer portion, and a thickness of a portion of the thickness-direction second outer layer portion adjacent to the second extension portion is larger than a thickness of a center portion in the length direction of the thickness-direction second outer layer portion;

where a bulging amount of the element body whose center portion along the length direction bulges to the outer side is defined as an element-body bulging amount M, a bulging amount of the element body whose center portion along the width direction bulges to the outer side is defined as an element-body bulging amount N, a bulging amount of the multilayer portion whose center portion along the length direction bulges to the outer side is defined as a multilayer-portion bulging amount m, and a bulging amount of the multilayer portion whose center portion along the width direction bulges to the outer side is defined as a multilayer-portion bulging amount n; and a number of stacked conductor layers is 300 or greater, the element-body bulging amount N and the multilayer-portion bulging amount n are about 20 μm or greater, respectively, and a relationship N>n is satisfied, and the element-body bulging amount M and the multilayer-portion bulging amount m are about 15 μm or greater, respectively, and a relationship M<m is satisfied.

6. The monolithic ceramic capacitor according to claim 5, wherein each of the plurality of ceramic dielectric layers includes at least one of barium titanate, $CaZrO_3$, $CaTiO_3$, and $SrTiO_3$.

* * * * *